Patented Nov. 17, 1942

2,302,468

UNITED STATES PATENT OFFICE 2,302,468

PROCESS OF OXIDIZING MENTHANES AND PRODUCTS THEREFROM

Robert C. Palmer, Carlisle H. Bibb, and William T. McDuffee, Jr., Pensacola, Fla., assignors to Newport Industries, Inc., Pensacola, Fla., a corporation of Delaware No Drawing. Application March 26, 1941, Serial No. 385,297

7 Claims. (Cl. 260—587)

This invention relates to a process of oxidizing menthanes and to the products produced thereby. More particularly, the invention relates to the catalytic oxidation of menthanes in liquid phase by means of molecular oxygen in the presence of an oxidizing catalyst. The products of oxidation include alcohols, aldehydes, ketones, oxides and acids. The present invention is directed to the recovery of a non-acid mixture of the alcohols, aldehydes, ketones and oxides, which mixture is useful as a substitute for pine oil, or for other purposes where its wetting, solvent and disinfecting properties can be used.

The present application is a continuation-in-part of our application entitled "Process of oxidizing menthanes and products produced thereby," Serial No. 303,027, filed November 6, 1939. In that application, the process of oxidation leading to the recovery of the acid constituents of the reaction mass, such as hydro toluic and hydro cumic acids is described and claimed.

It is an object of the present invention to provide an efficient process for the catalytic oxidation of menthanes in liquid phase by the use of molecular oxygen and for the recovery of the non-acid constituents from the reaction mass to obtain a mixture of alcohols, aldehydes, ketones and oxides having valuable solvent, wetting and disinfecting properties.

It is a further important object of this invention to provide a novel composition of matter comprising a mixture of alcohols, aldehydes, ketones and oxides obtainable by the catalytic oxidation of menthanes, such as p-menthane, which non-acid mixture can be separated for use as a substitute for pine oil.

Other and further important objects of this invention will become apparent from the following description and appended claims.

The starting material for our process is a menthane, such as ortho-, para- or meta-menthane, or a mixture containing predominantly menthane. The use, as a starting material, of a mixture such as that obtained by the hydrogenation of mono-cyclic terpenes or by the disproportionation of such terpenes, comprising p-menthane and cymene, is described in our copending application filed of even date herewith.

Oxidation catalysts that have been found most satisfactory belong to the group of oxides and hydroxides of the heavy metals, and their organic salts. Such oxygen containing compounds of the heavy metals may be used either by themselves or in admixture with each other. Mixtures of manganese and lead compounds, such as acetates, benzoates, or cumates of manganese and lead, are examples of mixed catalysts that have been found highly effective and that are preferred in our process. However, the hydrates, oxides or organic salts of any of the various so-called heavy metals, such as manganese, copper, cobalt, iron, lead, nickel, molybdenum, vanadium, silver, chromium and mercury, can be added to the charge to produce catalytic activity. Some metals are more effective than others.

In the preparation of a specific catalytic mixture, such as that of manganese and lead acetate, such a mixture can be conveniently made by fusing together 1 part of lead acetate containing 3 moles of water with 2 parts of manganese acetate containing 4 moles of water. The fusion is carried out, for instance, at a temperature of about 130° C. until all of the water has been driven off and an anhydrous, solid mass is obtained. This solid mass is then pulverized and the powdered mixture used as a catalyst. The particular ratio of manganese to lead is not important, since either of these two metals is itself catalytically active. However, the use of both manganese and lead is more effective at lower temperatures than the use of either, alone.

The following example will serve to illustrate a preferred embodiment of our invention:

160 gallons of p-menthane are put in a vessel having a device for passing air or oxygen into the charge. The vessel should be equipped with heating, cooling and agitating means. The spent air or other gas leaving the vessel goes through a reflux cooler, from which any oil entrained in the gases is returned to the oxidizing vessel and the fixed gases are vented to the atmosphere. About 20 lbs. of a powdered mixture of lead and manganese acetate, prepared as above described, are added to the charge of p-menthane and the oil and catalyst are agitated and heated to about 100° C., while air is being blown through the charge in a fine state of subdivision at the rate of about 20 cu. ft. per minute for a period of about 12 to 25 hours. There is thus produced about 150 gallons of oxidized oil. This oil is then fractionally distilled under vacuum to yield the following fractions:

|  | Gallons |
|---|---|
| Unreacted p-menthane | 76 |
| Oil consisting of a mixture of alcohols, aldehydes, oxides and ketones | 32 |
| Residue, comprising a mixture largely composed of hexa-hydro cumic and hexa-hydro toluic acid | 35 |

Instead of effecting the separation of the acids by fractional distillation, the entire reaction mass, prior to being submitted to fractional distillation, may be washed with a weak alkali solution, such as a 6% caustic soda solution. After washing out the acids, the remaining reaction mass may be subjected to fractional distillation at relatively high vacuum to separate the unreacted p-menthane from the mixture of alcohols, aldehydes, oxides and ketones.

The temperature of 100° C. given in the foregoing example is not critical, since higher temperatures may be used, such as 140° C., or temperatures as low as 30° C. may be used. With the lower temperatures, the reaction becomes slower.

We have observed that during the course of the oxidation reaction, there is a tendency toward the formation of peroxide-like bodies which would undoubtedly decompose with explosive violence when heated under conditions suitable for distillation. In order to remove these peroxide-like bodies, after the completion of the oxidation stage at about 100° C., the temperature of the charge in the still is advanced to around 125 to 140° C. and maintained at that temperature by circulation of cold water, if necessary, through the jacket of the still. Decomposition of the thermally decomposable oxygen containing compounds takes place rapidly at the temperature indicated, but by providing ample vacuum capacity and by circulating cooling water through the jacket of the still, the rate of evolution of non-condensible gases can be satisfactorily controlled so as to prevent substantial loss of vacuum and consequent rise in the boiling temperature of the charge in the still. Distillation is continued until the separation of the desired products of oxidation has been effected.

Other changes in the procedure may be made with those skilled in the art. More or less air may be used, but if less air is employed, the oxidation does not go so far and therefore a smaller proportion of the p-menthane is converted into its oxidation products.

When other menthanes than the para-compounds are oxidized by this method, the corresponding oxygenated products are produced. In the case of p-menthane, the oxygen attacks the tertiary carbon atom of the isopropyl side chain, forming dihydro terpineol, which may be further oxidized to the ketone and formaldehyde. At the same time, oxides are also produced, the latter being capable of isolation as an intermediate fraction between the recovered p-menthane and the alcohols and ketones, when the crude oxidized product is fractionally distilled.

The unreacted p-menthane, recovered from the reaction mass, can be reused in a succeeding batch. The time of oxidation can be considerably reduced if a small quantity, such as 10%, of the crude oxidation reaction mass of a previous run is added to a new batch to be oxidized. This assists in the activation of the catalyst, which, even at ordinary room temperature, may become so active that with good agitation practically all of the oxygen and the air used is consumed in a single batch. Furthermore, the addition of some of a previous crude reaction mass to a new batch causes the reaction to take place rapidly at the lowest temperature.

The mixture of alcohols, aldehydes, ketones and oxides, derived from the oxidation of p-menthane has been found to be of value as a substitute for pine oil, which it in many ways resembles. For example, this mixture forms clear concentrated solutions with soaps and water that give relatively stable emulsions on dilution, the emulsions having wetting out properties equal to similar pine oil compounds. Also, its germicidal power is of the same order as that of steam distilled pine oil. It is further a good solvent for resins and oils, thus adapting it for use in surface coating compositions.

Although the mixture as obtained from the oxidation reaction mass, after the removal of unreacted p-menthane and the acidic components, usually contains aldehydes and oxides, the main constituents are tertiary alcohols and ketones. Furthermore, as previously explained, the oxides can be removed by fractional distillation. Accordingly, the essential ingredients of the mixture produced in accordance with the present invention are tertiary alcohols and ketones.

In general, the mixture of alcohols and ketones, with or without small proportions of aldehydes and oxides, has the following physical properties:

Sp. gr. at 15.5° C _____ Between 0.9350 and 0.97.
B. pt. at 760 mm _____ Between 190 and 230° C.
Index of refraction, $D_{20°}$ ___ Between 1.47 and 1.50.

A typical mixture of the tertiary alcohols and ketones of our invention has a specific gravity of 0.9424, an index of refraction, $D_{20°}$, of 1.4839 and a boiling point of around 93° C. at 5 mm. absolute pressure. The bulk of the mixture can be distilled over at 86° C. at an absolute pressure of 4 mm.

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. As a new composition of matter having solvent, wetting and disinfecting properties, a mixture consisting largely of tertiary alcohols and ketones, obtained by the catalytic oxidation of a menthane by means of a catalytically active compound selected from the group consisting of oxides, hydroxides and carboxylic acid salts of the heavy metals, separating the acid constituents from the resulting reaction mass and recovering a mixture of alcohols and ketones therefrom, said mixture having a specific gravity at 15.5° C. between 0.9350 and 0.97, an index of refraction, $D_{20°}$, between 1.47 and 1.50 and a boiling point within the range of 190 to 230° C. at normal atmospheric pressure.

2. As a new composition of matter having solvent, wetting and disinfecting properties, a mixture comprising the non-acid oxidation reaction products of p-menthane obtained by catalytically oxidizing p-menthane by means of a catalytically active compound selected from the group consisting of oxides, hydroxides and carboxylic acid salts of the heavy metals and consisting largely of alcohols and ketones, said mixture having a specific gravity at 15.5° C. of about 0.9424, an index of refraction, $D_{20°}$, of about 1.4839 and a boiling point around 93° C. at an absolute pressure of 5 mm. of mercury.

3. The process of oxidizing a menthane to obtain a mixture of alcohols and ketones therefrom, which comprises subjecting a menthane in liquid phase to the action of molecular oxygen in the presence of an oxidation catalyst selected from the group consisting of oxides, hydroxides and carboxylic acid salts of heavy metals at a temperature up to 140° C. until a reaction mixture of alcohols, aldehydes, ketones, oxides, acids and unreacted menthane results, and fractionally distilling said reaction mixture to recover a fraction consisting principally of alcohols and ketones.

4. The process of oxidizing a menthane to obtain a mixture of alcohols and ketones therefrom, which comprises subjecting para-menthane in liquid phase to the action of molecular oxygen in the presence of an oxidation catalyst selected from the group consisting of oxides, hydroxides and carboxylic acid salts of heavy metals at a temperature up to 140° C. until a reaction mixture of alcohols, aldehydes, ketones, oxides, acids and unreacted para-menthane results, and fractionally distilling said reaction mixture under high vacuum to recover a fraction consisting principally of alcohols and ketones.

5. The process of oxidizing a menthane to obtain a mixture of alcohols and ketones therefrom, which comprises subjecting a menthane in liquid phase to the action of molecular oxygen in the presence of an oxidation catalyst comprising both lead and manganese compounds selected from the group consisting of oxides, hydroxides, and carboxylic acid salts of said metals at a temperature up to 140° C. until a reaction mixture of alcohols, aldehydes, ketones, oxides, acids and unreacted menthane results, and fractionally distilling said reaction mixture to recover a fraction consisting principally of alcohols and ketones.

6. The process of oxidizing a menthane to obtain a mixture of alcohols and ketones therefrom, which comprises subjecting a menthane in liquid phase to the action of molecular oxygen in the presence of an oxidation catalyst consisting essentially of a mixture of lead and manganese acetates at a temperature up to 140° C. until a reaction mixture of alcohols, aldehydes, ketones, oxides, acids and unreacted menthane results, and fractionally distilling said reaction mixture to recover a fraction consisting principally of alcohols and ketones.

7. The process of oxidizing para-menthane to obtain a mixture of tertiary alcohols and ketones therefrom, which comprises subjecting para-menthane in liquid phase to the action of molecular oxygen in the presence of an oxidation catalyst consisting of a heavy metal compound selected from the group consisting of oxides, hydroxides and carboxylic acid salts of said heavy metals at a temperature between 30 and 140° C. until a substantial proportion of said para-menthane has been converted into a reaction mixture of tertiary alcohols, aldehydes, ketones, oxides, and acids, and fractionally distilling said reaction mixture under high vacuum to recover a fraction consisting principally of said tertiary alcohols and ketones.

ROBERT C. PALMER.
CARLISLE H. BIBB.
WILLIAM T. McDUFFEE, Jr.